July 7, 1959   H. KRAUSE   2,893,262
EMERGENCY BRAKES AND RELEASES THEREFOR
Filed Jan. 11, 1954   3 Sheets-Sheet 1
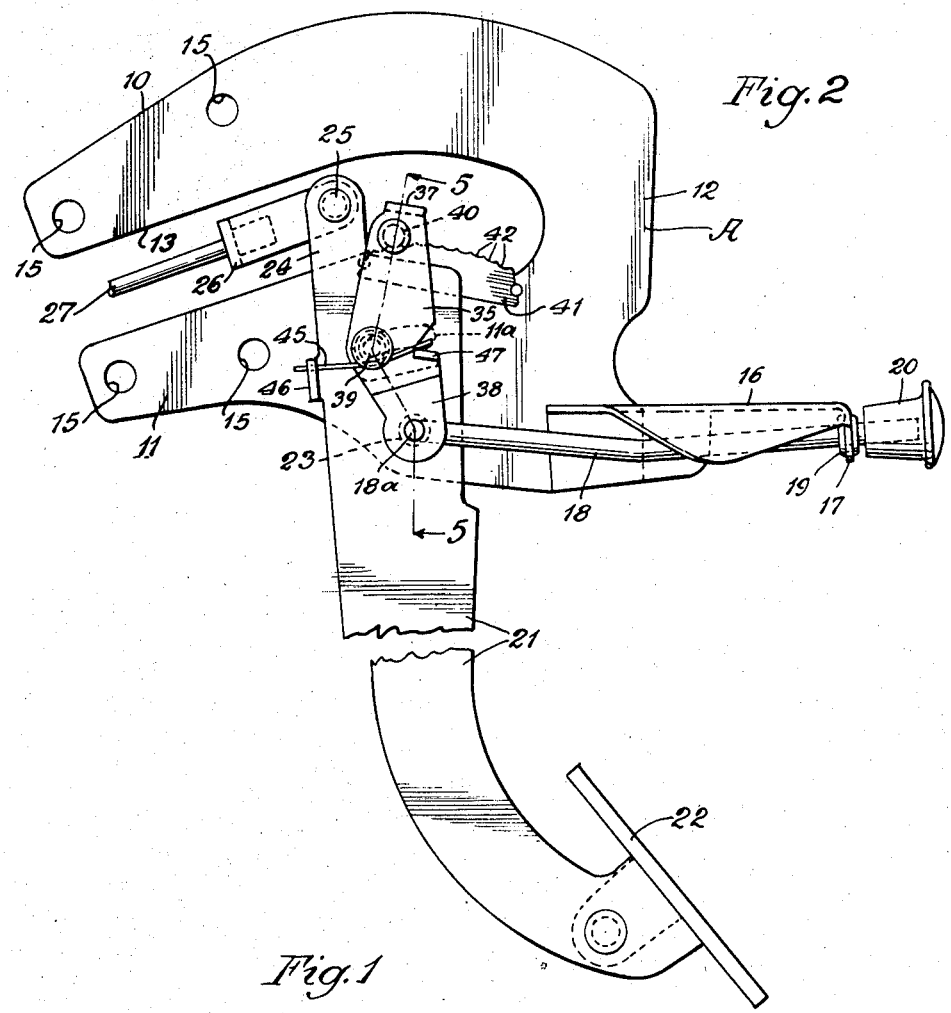
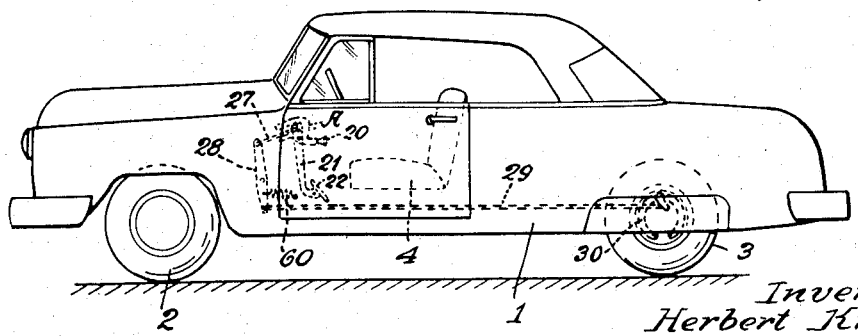
Inventor
Herbert Krause
by Parker & Carter
Attorneys

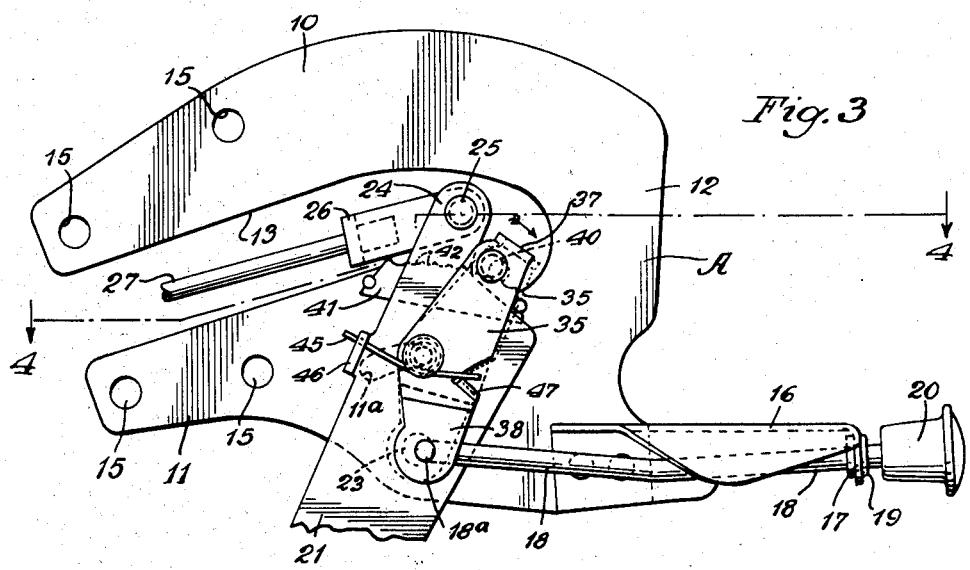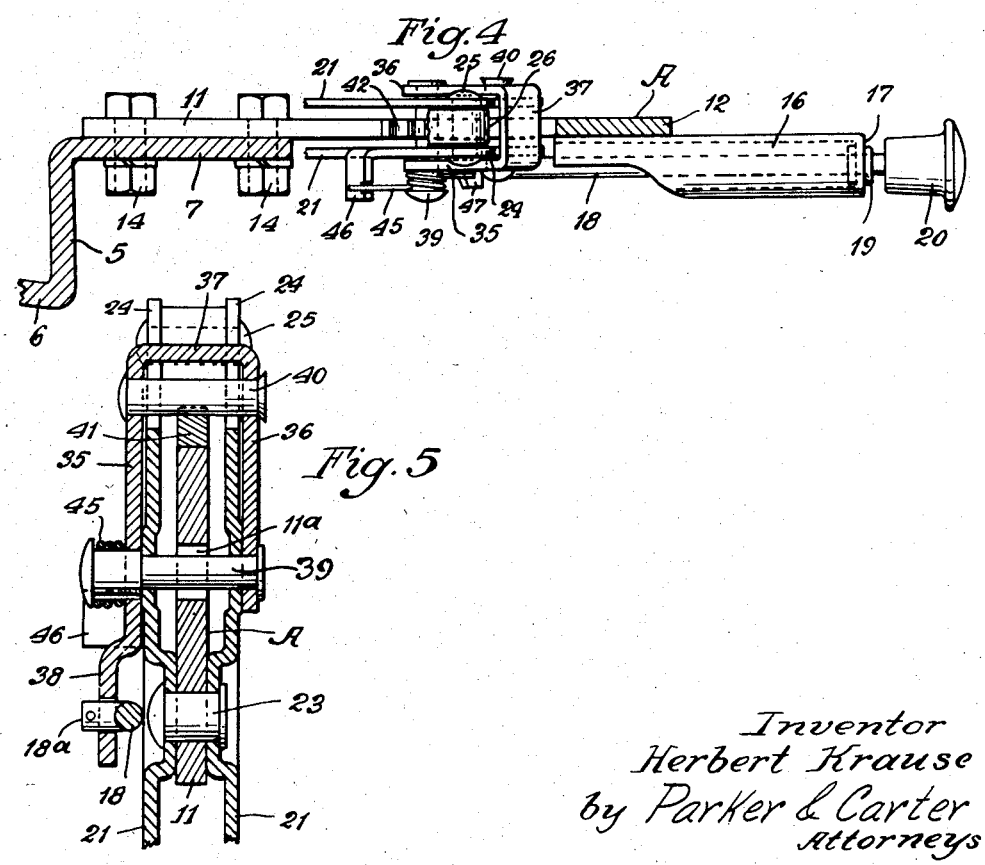

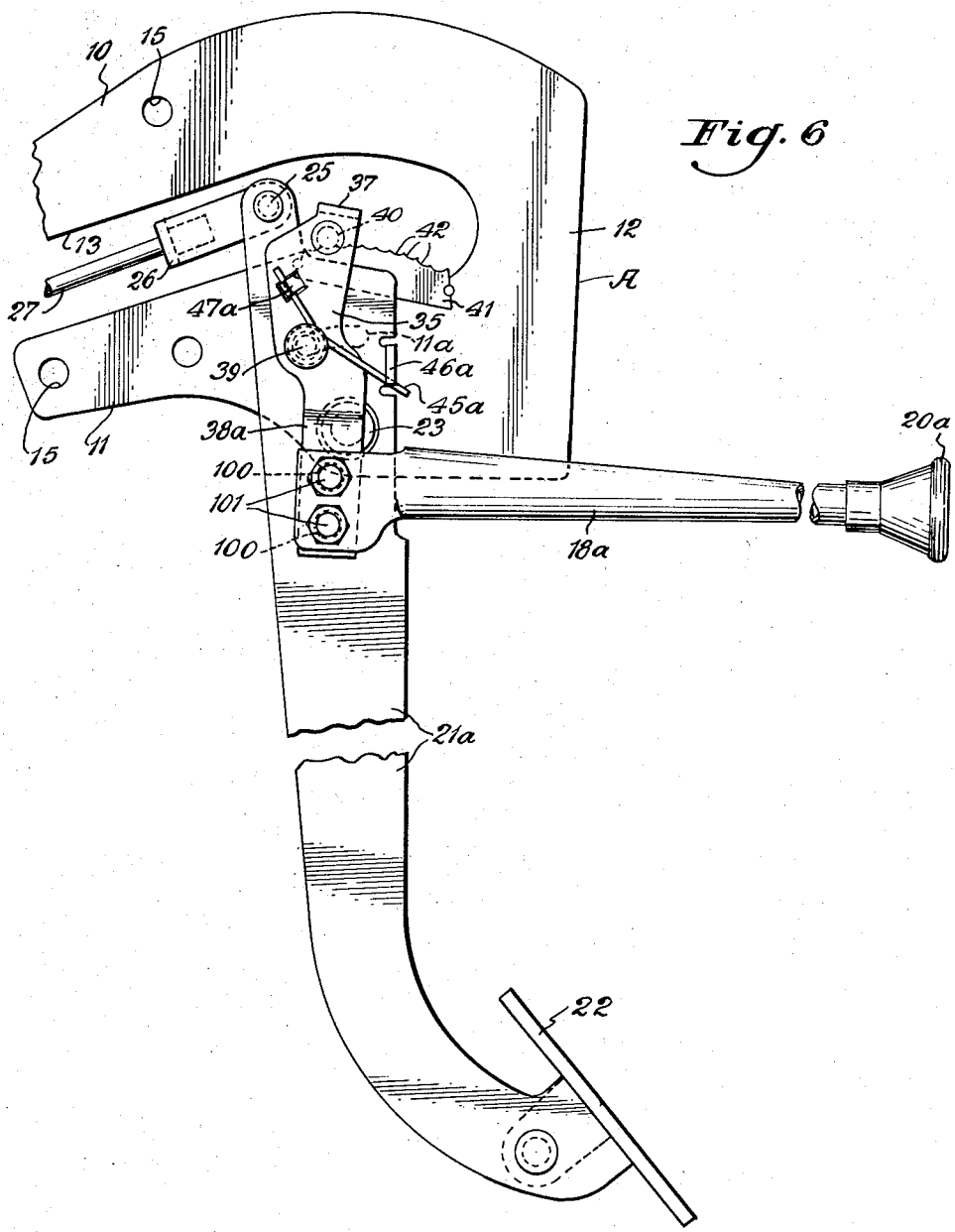

United States Patent Office 2,893,262
Patented July 7, 1959

2,893,262

EMERGENCY BRAKES AND RELEASES THEREFOR

Herbert Krause, Chicago, Ill., assignor to Chicago Forging and Manufacturing Company, Chicago, Ill., a corporation of Delaware Application January 11, 1954, Serial No. 403,407

5 Claims. (Cl. 74—538)

My invention relates to locking and release mechanisms for brakes and the like, such as emergency brakes for automobiles. Experience has taught that prior mechanisms for this purpose were such that if a sufficiently secure locking device were provided, the release therefor was cumbersome and erratic in operation and required the exertion of considerable force in the movement of the release control member a considerable distance. Accordingly, it is one purpose of my invention to provide a mechanism which will be effective to securely lock brakes and the like and which will nonetheless be easily released by exertion of minimum force in the movement of a release control member over the shortest possible distance.

Another purpose is to provide a locking and release mechanism so constructed that portions thereof automatically take up for wear or variations in size and shape specifications incidental to assembly line parctice.

Another purpose is to provide a locking and release mechanism which is easy to manufacture and requires a minimum of individual parts.

Other purposes will appear from time to time in the course of the specification and claims.

The present application is a continuation-in-part of my application, Serial No. 313,664, filed October 8, 1952, now Patent No. 2,722,136.

My invention is illustrated more or less diagrammatically in the accompanying drawings, wherein:

Figure 1 illustrates, somewhat diagrammatically, a vehicle including the brake control of the present invention;

Figure 2 is a partial side elevation, on an enlarged scale, illustrating the manual and the pedal controls, and their direct connections;

Figure 3 is a view similar to Figure 2, illustrating the parts in a different position;

Figure 4 is a section on the line 4—4 of Figure 3;

Figure 5 is a section on the line 5—5 of Figure 2; and

Figure 6 is a partial side elevation illustrating a variant form of my device.

Like parts are indicated by like symbols throughout the specification and drawings.

Referring to the drawings, 1 generally indicates an automobile chassis having front wheels 2 and rear wheels 3. The operator of the vehicle will be taken to be sitting in a seat conventionally illustrated at 4. Any suitable bracket or support 5 is shown in Figure 4. The bracket 5 will be understood to be suitably connected to the vehicle, and its portion 6 may be secured, for example, to the body of the car forwardly of the front door, or to the dashboard, depending upon the specific design of the car. The bracket 5 is shown as having a rearwardly extending portion 7 to which the below described structure is secured.

A main plate, generally indicated as A in Figures 2 and 3, is suitably secured to the bracket 7 or to an equivalent support. The frame A is shown as having an upper member 10 and a lower member 11, the two being connected at their rear end by a conecting portion 12, and being separated by a species of slot or opening 13. It will be understood, of course, that the shape of the parts may be widely varied. The plate A may be secured to the bracket 7, for example, by any suitable bolts or securing members 14 which will be understood to pass through the apertures 15.

Secured to or forming part of the plate A is a rearwardly extending piece or support 16 which includes or has secured to it a bearing 17 in which a rod 18 is slidably mounted. The rod actually passes through a rubber eye 19 in the bearing portion 17, to prevent rattle. At its outer or rear end the rod 19 is provided with a manual control member 20.

21 is a brake lever for foot operation. Shown at its bottom is any suitable foot pedal or foot engageable element 22, the details of which do not, of themselves, form part of the present invention. The brake lever 21 is pivoted to the lower member 11 of the plate A, as at 23. As will be clear from Figure 5, the lever 21 may be formed of two parts which move in unison about the pivot 23, as shown in Figure 5, the two side elements of the lever 21 being located at opposite sides of the plate A. It will be understood, therefore, that the operator, by pressing against the plate 22, can rotate the lever 21 about the pivot 23. The upper lever portion or portions 24 are connected at their upper end by a suitable pivot or transverse member 25 to which is pivoted the end member 26 of a rod 27 which extends to the rocking lever 28 of Figure 1, the opposite end of which may be secured to any suitable rod 29 to actuate the brake 30. It will be understood that the connections 28, 29 and 30 are merely diagrammatic, and that any suitable means for actuating the emergency brake of an automotive vehicle may be employed. Whereas a rod 27 is illustrated, any suitable flexible member may be employed.

It will be understood that when the operator presses against the plate 22, and the lever elements 21 rotate about the pivot 23, the rod or tension member 27 moves to the right, referring to the position of the parts in Figures 2 and 3, and this movement is suitably transferred to apply the brake, for example, the emergency brake of an automotive vehicle.

The present structure includes a latching or locking means for holding the brake applied and a readily operable release therefor. As shown, for example, in Figure 5, the U-shaped member is employed, including side elements 35 and 36, and the connecting top or loop 37. The side element 35 includes a downwardly extending portion 38, which is lacking from the opposite side 36. The two side elements 35 and 36 are pivoted to the levers or lever elements 21, as by the pin 39 which passes through a generally arcuate slot 11a in the portion 11 of the plate A. The parts are so proportioned that the pin 39 is free in the slot 11a and does not contact its edges. The U-shaped member thus formed carries an upper or locking pin 40 adapted to ride over or be engaged by serrations 42 in an abutment plate or element 41. For example, it may be a hardened piece or a separate piece secured to or set into or welded to the portion 11 of the plate A, as shown, for example, in Figures 2 and 3. The U-shaped member 35, 36, 37 serves as a species of locking dog, and is normally urged toward locking position, with the pin 40 in engagement with one of the serrations 42, for example, by the spring 45, one end of which engages an offset portion or ear 46 of one of the lever elements 21.

The other end engages an abutment 47 on the member 35. It will be understood that when the operator presses against the plate 22, the parts are moved from the position of Figure 2 to the position of Figure 3, depending upon how much force is employed or is necessary to set the brake. Figure 3 actually illustrates the parts in break-holding position, with the U-shaped dog 35, 36, 37 about to move from the full-line toward the final dotted-line locking position. The arrow of Figure 3 indicates the direction in which the log or latch is moved by the spring 45.

The relation of the pivot 39 and the axis of the pin 40 is such, in relation to the pivot 23, that the pin 40 can ride over the serrations of the plate 41 and drop into the furthest serration it can reach, into which position it is urged by the spring 45. When the dog is in the dotted-line position of Figure 3, it will be understood that it is effective to hold the levers 21 in the full-line position of Figure 3, with the brake held in fully applied position.

When the user wishes to release the brake, all that he has to do is to pull the knob 20 to the right, referring to the position of the parts as shown in Figures 2 and 3. The release control rod 18 is suitably secured to the downward extension 38 of the side element 35 of the above-described dog, as shown at 18a in Figure 5. Thus, when the operator pulls the rod 18 with sufficient force, he is able, manually, to overcome the pull of the spring 45, with the result that the dog and its locking pin 40 are moved to the position in which they are shown in Figure 2. All that is necessary to release the pin 40 from the serration in which it is seated, the result then being that the whole structure snaps to the release position of Figure 2. This final snap action results from any suitable spring structure associated with the brakes to be actuated. A suitable spring for the purpose is diagrammatically illustrated at 60 in Figure 1.

Referring now particularly to Figure 6, I illustrate a variant form of brake release. The locking lever 35 has a lower extension 38a which may have a pair of apertures 100. Secured to the extension 38a, as by the nut and bolt connections 101 which extend through the pair of the apertures 100, is an operating lever 18a. It will be observed that the operating lever 18a may extend rearwardly from the extension 38a at an angle of approximately 90 degrees thereto and that the lever 18a is fixed in relation to the extension 38a. The lever 18a has a manually operable knob or handle 20a.

In the variant form shown in Figure 6, I illustrate a spring 45a, which corresponds to the spring 45 illustrated in Figures 1 and 2. An abutment 46a for one end of the spring 45 is located on an opposite face of the brake lever 21a from that on which abutment 46 is shown in Figure 1. Similarly, an abutment 47a is located on an opposite edge of the locking lever 35. It will thus be seen that the spring 45a is positioned to accomplish the same function as that of the spring 45, the parts being merely reversed.

It will be realized that, whereas I have described and illustrated a practical and operative device, nevertheless, many changes may be made in the size, shape, number and disposition of parts without departing from the spirit of my invention. The description and drawings should, therefore, be taken as in a broad sense illustrative or diagrammatic, rather than as limited to my precise showing.

The use and operation of my invention is as follows:

To summarize the operation of the device, the operator can set the emergency brake by merely using a sufficient foot thrust against the plate 22. This actuation of the plate 22 operates against means such as the spring 60 and creates, thereby, a re-acting force, through the rod 27 and pivot 25, against the arm 21 and pedal 22, sufficient to hold the brakes in set position, the spring 45, 45a being effective to urge the pin 40 into seating position on one of the serrations 42. The operator then releases his foot thrust, but the above-described locking connection or dog holds the brake or brakes set, since the lever elements 21 are held in brake-actuating position by the dogs 35, 36, 37 and the pin 40. All that the operator has to do to release the emergency brake is merely to pull on the knob 20 and thus on the rod 18. It will be understood that by the slight movement of the rod 18, the pin 40 is raised completely away from the serrations, so that the spring 60, or its suitable equivalent, operates to snap the parts to the full release position of Figure 2.

In the variant form of my device illustrated in Figure 6, I provide means for releasing my emergency brake with a minimum of exertion on the part of the operator. Since the operating lever 18a is fixed in relation to the extension 38a, and since the locking lever 35 is pivoted as at 39, it will be observed that the member 40 may be removed from engagement with the serrations 42 upon a raising of the operating lever 18a. Since the lever 18a is of substantial extension, it will be clear that a substantial leverage is provided, and that only the very slightest upward movement, by the operator, of the handle member 2a is sufficient to separate the members 40, 42 and thus to unlock the emergency brake.

I claim:

1. In a locking and release mechanism for emergency brakes and the like, a main plate, a generally arcuate serrated gripping surface on said main plate, a brake lever rotatably mounted on said plate, a locking lever pivoted on and at a point intermediate the ends of said brake lever for rotation therewith, said locking lever having a generally U-shaped end portion, said end portion having a pair of spaced side walls paralleling and adjacent the opposite outer surfaces of said brake lever and said plate, said end portion having a cross wall joining said spaced walls and extending across and outwardly spaced from said serrated gripping surface, a cylindrical pin extending between and mounted in said spaced side walls paralleling said cross wall and spaced from said cross wall, yielding means connected to said brake lever and said locking lever and positioned to urge said locking lever in a clockwise direction to urge said cylindrical pin inwardly against said serrated surface, said cylindrical pin being dimensioned to seat within the serrations of said surface, means for releasing said locking lever from said serrated surface including a member connected to the opposite end portion of said locking lever beyond said pivot point, said brake lever being rotatable in a clockwise direction to move said cylindrical pin along said serrated surface to engage said brake, said releasing member being rotatable in a counterclockwise direction to release said cylindrical pin from said serrated portion.

2. The structure of claim 1, wherein said serrations comprise a plurality of parallel adjacent concave surfaces, the lateral dimension of each of said surfaces being substantially less than half the perimeter of said cylindrical pin.

3. In a locking and release mechanism for emergency brakes and the like, a main plate, a brake lever rotatably mounted on said plate, said brake lever comprising a pair of spaced parallel side walls, each of said side walls being rotatably mounted on an opposite side of said plate, said side walls having parallel portions extending beyond an edge of said plate, said plate having a serrated edge surface between said side walls and inwardly spaced from said extending portions, a locking lever rotatably mounted on said brake lever for rotation therewith and relative thereto, yielding means associated with said brake lever and said locking lever to urge said locking lever toward locking position, said locking lever comprising a pair of spaced side walls, each of said last named side walls being rotatably mounted for rotation on the outer surface of each of said brake lever side walls, said locking lever side walls having a cross wall integral therewith and outwardly spaced from said serrated surface, a cylindrical pin mounted in said locking lever side wall for engagement with said serrated surface and adjacent said extending portions of said brake lever, and means for releasing said brake lever including an arm secured to said locking lever at a point beyond its pivot from said pin, said brake lever being rotatable in a clockwise direction to apply said brakes, said locking lever being rotatable in a counterclockwise direction to lift said pin out of said serrations.

4. The structure of claim 3 wherein said arm is fixedly secured to said locking lever and extends substantially perpendicularly therefrom.

5. In a locking and release mechanism for emergency brakes and the like, a support, an elongated brake lever rotatably mounted on said support, a serrated surface on said support, a locking lever rotatably mounted on said brake lever for rotation with and relative to said brake lever, a cylindrical element carried by said locking lever and overlying said serrated surface, yielding means associated with said brake lever and said locking lever and positioned to urge said locking lever toward locking position and said cylindrical element toward engagement with said serrated surface, said brake lever being rotatably mounted on said support at a point spaced from said serrated surface for rotation in clock-wise direction in a path toward brake setting position, said path having a radius of curvature encompassing said serrated surface, said locking lever being mounted for rotation on said brake lever at a point between said mounting point of said brake lever and said serrated surface for rotation in clock-wise direction toward locking position in a path having a radius of curvature encompassing said serrated surface but shorter than the radius of curvature of the path of said brake lever.

References Cited in the file of this patent
UNITED STATES PATENTS

| | | |
|---|---|---|
| 719,806 | Johnson | Feb. 3, 1903 |
| 1,493,760 | Link | May 13, 1924 |
| 1,980,703 | Sandberg | Nov. 13, 1934 |
| 2,182,279 | Caldwell | Dec. 5, 1939 |
| 2,294,002 | Saunders | Aug. 25, 1942 |
| 2,308,898 | Skareen | Jan. 19, 1943 |
| 2,309,454 | Heller | Jan. 26, 1943 |
| 2,467,557 | Jandus | Apr. 19, 1949 |
| 2,587,725 | Hinsey | Mar. 4, 1952 |
| 2,722,136 | Krause | Nov. 1, 1955 |